United States Patent [19]
Sager et al.

[11] Patent Number: 5,828,868
[45] Date of Patent: Oct. 27, 1998

[54] PROCESSOR HAVING EXECUTION CORE SECTIONS OPERATING AT DIFFERENT CLOCK RATES

[75] Inventors: David J. Sager; Thomas D. Fletcher; Glenn J. Hinton; Michael D. Upton, all of Portland, Oreg.

[73] Assignee: Intel Corporation, Santa Clara, Calif.

[21] Appl. No.: 746,606

[22] Filed: Nov. 13, 1996

[51] Int. Cl.⁶ ...................................................... G06F 1/06
[52] U.S. Cl. .......................... 395/556; 395/559; 395/555; 395/800.32
[58] Field of Search ............................... 395/750.04, 556, 395/555, 557, 558, 559, 600, 800.32

[56] References Cited

U.S. PATENT DOCUMENTS

| | | | |
|---|---|---|---|
| 5,142,684 | 8/1992 | Perry et al. | 395/750.03 |
| 5,222,239 | 6/1993 | Rosch | 395/750.04 |
| 5,309,561 | 5/1994 | Overhouse et al. | 395/200 |
| 5,630,107 | 5/1997 | Carmean et al. | 395/560 |
| 5,644,760 | 7/1997 | Polzin et al. | 395/555 |
| 5,680,543 | 10/1997 | Bhawmik | 395/183.06 |

*Primary Examiner*—Alyssa H. Bowler
*Assistant Examiner*—Walter D. Davis, Jr.
*Attorney, Agent, or Firm*—Blakely, Sokoloff, Taylor & Zafman

[57] ABSTRACT

A processor including a first execution core section clocked to perform execution operations at a first clock frequency, and a second execution core section clocked to perform execution operations at a second clock frequency which is different than the first clock frequency. The second execution core section runs faster and includes a data cache and critical ALU functions, while the first execution core section includes latency-tolerant functions such as instruction fetch and decode units and non-critical ALU functions. The processor may further include an I/O ring which may be still slower than the first execution core section. Optionally, the first execution core section may include a third execution core section whose clock rate is between that of the first and second execution core sections. Clock multipliers/dividers may be used between the various sections to derive their clocks from a single source, such as the I/O clock.

4 Claims, 6 Drawing Sheets

PROCESSOR HAVING EXECUTION CORE SECTIONS OPERATING AT DIFFERENT CLOCK RATES

BACKGROUND OF THE INVENTION

1. Field of the Invention

The present invention relates generally to the field of high speed processors, and more specifically to a processor including a sub-core operating at a higher frequency than the rest of the execution core, and also to a replay architecture for facilitating data-speculating operation of the sub-core.

2. Background of the Prior Art

FIG. 1 illustrates a microprocessor 100 according to the prior art. The microprocessor includes an I/O ring which operates at a first clock frequency, and an execution core which operates at a second clock frequency. For example, the Intel486DX2 may run its I/O ring at 33 MHz and its execution core at 66 MHz for a 2:1 ratio (½ bus), the IntelDX4 may run its I/O ring at 25 MHz and its execution core at 75 MHz for a 3:1 ratio (⅓ bus), and the Intel Pentium® OverDrive® processor may operate its I/O ring at 33 MHz and its execution core at 82.5 MHz for a 2.5:1 ratio (5/2 bus).

A distinction may be made between "I/O operations" and "execution operations". For example, in the DX2, the I/O ring performs I/O operations such as buffering, bus driving, receiving, parity checking, and other operations associated with communicating with the off-chip world, while the execution core performs execution operations such as addition, multiplication, address generation, comparisons, rotation and shifting, and other "processing" manipulations.

The processor 100 may optionally include a clock multiplier. In this mode, the processor can automatically set the speed of its execution core according to an external, slower clock provided to its I/O ring. This may reduce the number of pins needed. Alternatively, the processor may include a clock divider, in which case the processor sets the I/O ring speed responsive to an external clock provided to the execution core.

These clock multiply and clock divide functions are logically the same for the purposes of this invention, so the term "clock mult/div" will be used herein to denote either a multiplier or divider as suitable. The skilled reader will comprehend how external clocks may be selected and provided, and from there multiplied or divided. Therefore, specific clock distribution networks, and the details of clock multiplication and division, will not be expressly illustrated. Furthermore, the clock mult/div units need not necessarily be limited to integer multiple clocks, but can perform e.g. 2:5 clocking. Finally, the clock mult/div units need not necessarily even be limited to fractional bus clocking, but can, in some embodiments, be flexible, asynchronous, and/or programmable, such as in providing a P/Q clocking scheme.

The basic motivation for increasing clock frequencies in this manner is to reduce instruction latency. The execution latency of an instruction may be defined as the time from when its input operands must be ready for it to execute until its result is ready to be used by another instruction. Suppose that a part of a program contains a sequence of N instructions, $I_1, I_2, I_3, \ldots, I_N$. Suppose that $I_{n+1}$ requires, as part of its inputs, the result of $I_n$, for all n, from 1 to N−1. This part of the program may also contain any other instructions. Then we can see that this program cannot be executed in less time than $T = L_1 + L_2 + L_3 + \ldots + L_N$, where $L_n$ is the latency of instruction $I_n$, for all n from 1 to N. In fact, even if the processor was capable of executing a very large number of instructions in parallel, T remains a lower bound for the time to execute this part of this program. Hence to execute this program faster, it will ultimately be essential to shorten the latencies of the instructions.

We may look at the same thing from a slightly different point of view. Define that an instruction $I_n$ is "in flight" from the time that it requires its input operands to be ready until the time when its result is ready to be used by another instruction. Instruction $I_n$ is therefore "in flight" for a length of time $L_n = A_n * C$ where $A_n$ is the latency, as defined above, of In, but this time expressed in cycles. C is the cycle time. Let a program execute N instructions as above and take M "cycles" or units of time to do it. Looked at from either point of view, it is critically important to reduce the execution latency as much as possible.

The average latency can be conventionally defined as $1/N*(L_1+L_2+L_3+ \ldots +L_N) = C/N*(A_1+A_2+A_3+ \ldots +A_N)$. Let $f_j$ be the number of instructions that are in flight during cycle j. We can then define the parallelism P as the average number of instructions in flight for the program or $1/M*(f_1+f_2+f_3+ \ldots +f_M)$.

Notice that $f_1+f_2+f_3+ \ldots +f_M = A_1+A_2+A_3+ \ldots +A_N$. Both sides of this equation are ways of counting up the number of cycles in which instructions are in flight, wherein if x instructions are in flight in a given cycle, that cycle counts as x cycles.

Now define the "average bandwidth" B as the total number of instructions executed, N, divided by the time used, $M*C$, or in other words, $B = N/(M*C)$.

We may then easily see that $P = L*B$. In this formula, L is the average latency for a program, B is its average bandwidth, and P is its average Parallelism. Note that B tells how fast we execute the program. It is instructions per second. If the program has N instructions, it takes N/B seconds to execute it. The goal of a faster processor is exactly the goal of getting B higher.

We now note that increasing B requires either increasing the parallelism P, or decreasing the average latency L. It is well known that the parallelism, P, that can be readily exploited for a program is limited. Whereas, it is true that certain classes of programs have large exploitable parallelism, a large class of important programs has P restricted to quite small numbers.

One drawback which the prior art processors have is that their entire execution core is constrained to run at the same clock speed.

This limits some components within the core in a "weakest link" or "slowest path" manner.

In the 1960s and 1970s, there existed central processing units in which a multiplier or divider co-processor was clocked at a frequency higher than other circuitry in the central processing unit. These central processing units were constructed of discrete components rather than as integrated circuits or monolithic microprocessors. Due to their construction as co-processors, and/or the fact that they were not integrated with the main processor, these units should not be considered as "sub-cores".

Another feature of some prior art processors is the ability to perform "speculative execution". This is also known as "control speculation", because the processor guesses which way control (branching) instructions will go. Some processors perform speculative fetch, and others, such as the Intel Pentium Pro processor, also perform speculative execution.

Control speculating processors include mechanisms for recovering from mispredicted branches, to maintain program and data integrity as though no speculation were taking place.

FIG. 2 illustrates a conventional data hierarchy. A mass storage device, such as a hard drive, stores the programs and data (collectively "data") which the computer system (not shown) has at its disposal. A subset of that data is loaded into memory such as DRAM for faster access. A subset of the DRAM contents may be held in a cache memory. The cache memory may itself be hierarchical, and may include a level two (L2) cache, and then a level one (L1) cache which holds a subset of the data from the L2. Finally, the physical registers of the processor contain a smallest subset of the data. As is well known, various algorithms may be used to determine what data is stored in what levels of this overall hierarchy. In general, it may be said that the more recently a datum has been used, or the more likely it is to be needed soon, the closer it will be held to the processor.

The presence or absence of valid data at various points in the hierarchical storage structure has implications on another drawback of the prior art processors, including control speculating processors. The various components within their execution cores are designed such that they cannot perform "data speculation", in which a processor guesses what values data will have (or, more precisely, the processor assumes that presently-available data values are correct and identical to the values that will ultimately result, and uses those values as inputs for one or more operations), rather than which way branches will go. Data speculation may involve speculating that data presently available from a cache are identical to the true values that those data should have, or that data presently available at the output of some execution unit are identical to the true values that will result when the execution unit completes its operation, or the like.

Like control speculating processors' recovery mechanisms, data speculating processors must have some mechanism for recovering from having incorrectly assumed that data values are correct, to maintain program and data integrity as though no data speculation were taking place. Data speculation is made more difficult by the hierarchical storage system, especially when it is coupled with a microarchitecture which uses different clock frequencies for various portions of the execution environment.

It is well-known that every processor is adapted to execute instructions of its particular "architecture". In other words, every processor executes a particular instruction set, which is encoded in a particular machine language. Some processors, such as the Pentium Pro processor, decode those "macro-instructions" down into "micro-instructions" or "uops", which may be thought of as the machine language of the micro-architecture and which are directly executed by the processor's execution units. It is also well-known that other processors, such as those of the RISC variety, may directly execute their macro-instructions without breaking them down into micro-instructions. For purposes of the present invention, the term "instruction" should be considered to cover any or all of these cases.

SUMMARY OF THE INVENTION

The invention provides a microprocessor having two or more levels of execution sub-core each clocked at different frequencies. The processor may also have an I/O ring, which may be clocked at yet another frequency. Clock division or multiplication may be used between the various levels, to derive the various clocks from a common clock, such as the I/O clock, which may be provided from off-chip. Having the different clock domains enables the designer to make trade-offs in the design of various components of the chip, such as individual execution units, instruction fetch and decode units, register files, caches, and the like. Thus, selected components can be designed to operate at a very high frequency, without requiring the entire chip to be designed to operate at this frequency. Less latency-critical units, or those whose required throughput can be obtained by twice as many units running at half the clock speed, can be relegated to the slower sections of the chip, easing their design considerably.

DETAILED DESCRIPTION OF THE INVENTION

Figure 3:
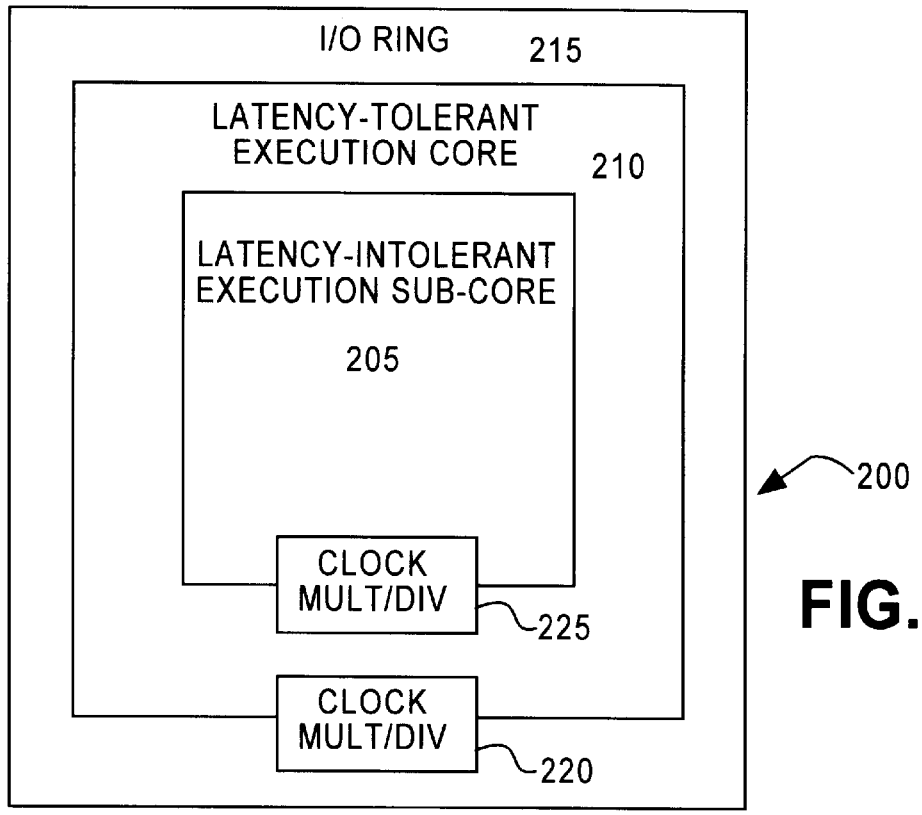
FIG. 3 is a block diagram illustrating the processor of the present invention, and showing a plurality of execution core sections each having its own clock frequency.

FIG. 3 illustrates the high-speed sub-core 205 of the processor 200 of the present invention. The high-speed sub-core includes the most latency-intolerant portions of the particular architecture and/or microarchitecture employed by the processor. For example, in an Intel Architecture processor, certain arithmetic and logic functions, as well as data cache access, may be the most unforgiving of execution latency.

Other functions, which are not so sensitive to execution latency, may be contained within a more latency-tolerant execution core 210. For example, in an Intel Architecture processor, execution of infrequently-executed instructions, such as transcendentals, may be relegated to the slower part of the core.

The processor 200 communicates with the rest of the system (not shown) via the I/O ring 215. If the I/O ring operates at a different clock frequency than the latency-tolerant execution core, the processor may include a clock mult/div unit 220 which provides clock division or multiplication according to any suitable manner and conventional means. Because the latency-intolerant execution sub-core 205 operates at a higher frequency than the rest of the latency-tolerant execution core 210, there may be a mechanism 225 for providing a different clock frequency to the latency-intolerant execution sub-core 205. In one mode, this is a clock mult/div unit 225.

Figure 4:
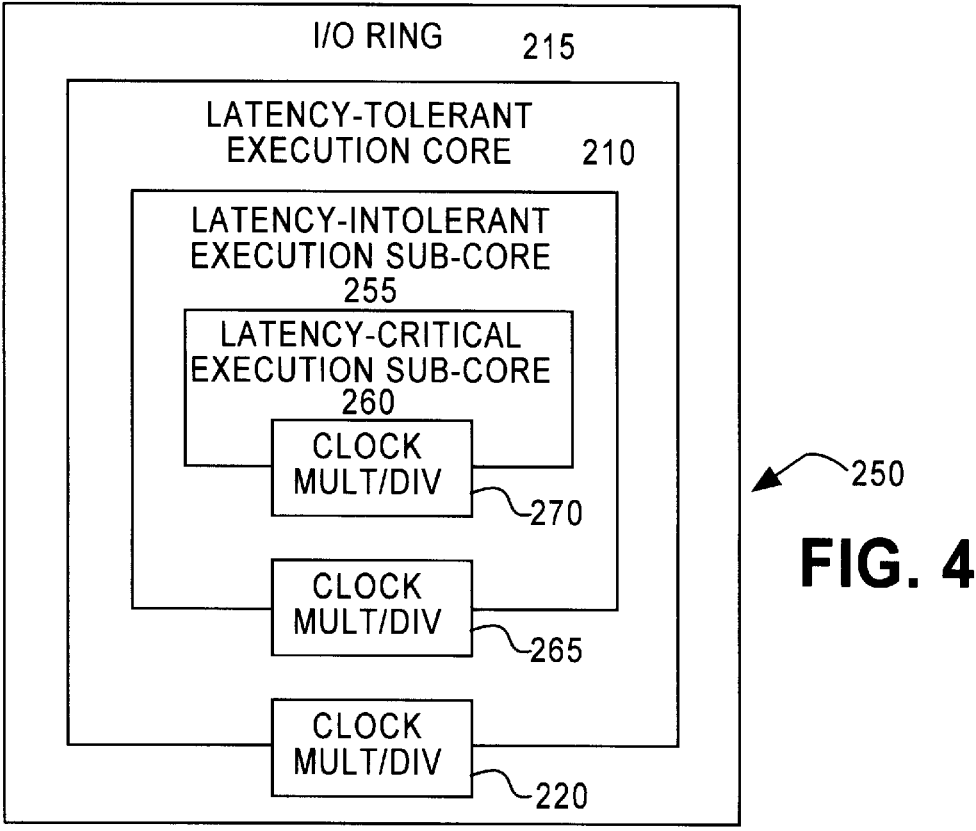
FIG. 4 is a block diagram illustrating a mode in which the processor of FIG. 3 includes yet another sub-core with its own clock frequency.

FIG. 4 illustrates a refinement of the invention shown in FIG. 3. The processor 250 of FIG. 4 includes the I/O ring 215, clock mult/div unit 220, and latency-tolerant execution core 210. However, in place of the unitary sub-core (205) and clock mult/div unit (225) of FIG. 3, this improved processor 250 includes a latency-intolerant execution sub-core 255 and an even more latency-critical execution sub-core 260, with their clock mult/div units 265 and 270, respectively.

The skilled reader will appreciate that this is illustrative of a hierarchy of sub-cores, each of which includes those units which must operate at least as fast as the respective sub-core level. The skilled reader will further appreciate that the selection of what units go how deep into the hierarchy will be made according to various design constraints such as die area, clock skew sensitivity, design time remaining before tapeout date, and the like. In one mode, an Intel Architecture processor may advantageously include only its most common integer ALU functions and data storage portion of its data cache in the innermost sub-core. In one mode, the innermost sub-core may also include the register file; although, for reasons including those stated above concerning FIG. 2, the register file might not technically be needed to operate at the highest clock frequency, its design may be simplified by including it in a more inner sub-core that is strictly necessary. For example, it may be more efficient to make twice as fast a register file with half as many ports, than vice versa.

In operation, the processor performs an I/O operation at the I/O ring and at the I/O clock frequency, such as to bring in a data item not presently available within the processor. Then, the latency-tolerant execution core may perform an execution operation on the data item to produce a first result. Then, the latency-intolerant execution sub-core may perform an execution operation on the first result to produce a second result. Then, the latency-critical execution sub-core may perform a third execution operation upon the second result to produce a third result. Those skilled in the art will understand that the flow of execution need not necessarily proceed in the strict order of the hierarchy of execution sub-cores. For example, the newly read in data item could go immediately to the innermost core, and the result could go from there to any of the core sections or even back to the I/O ring for writeback.

Figure 5:
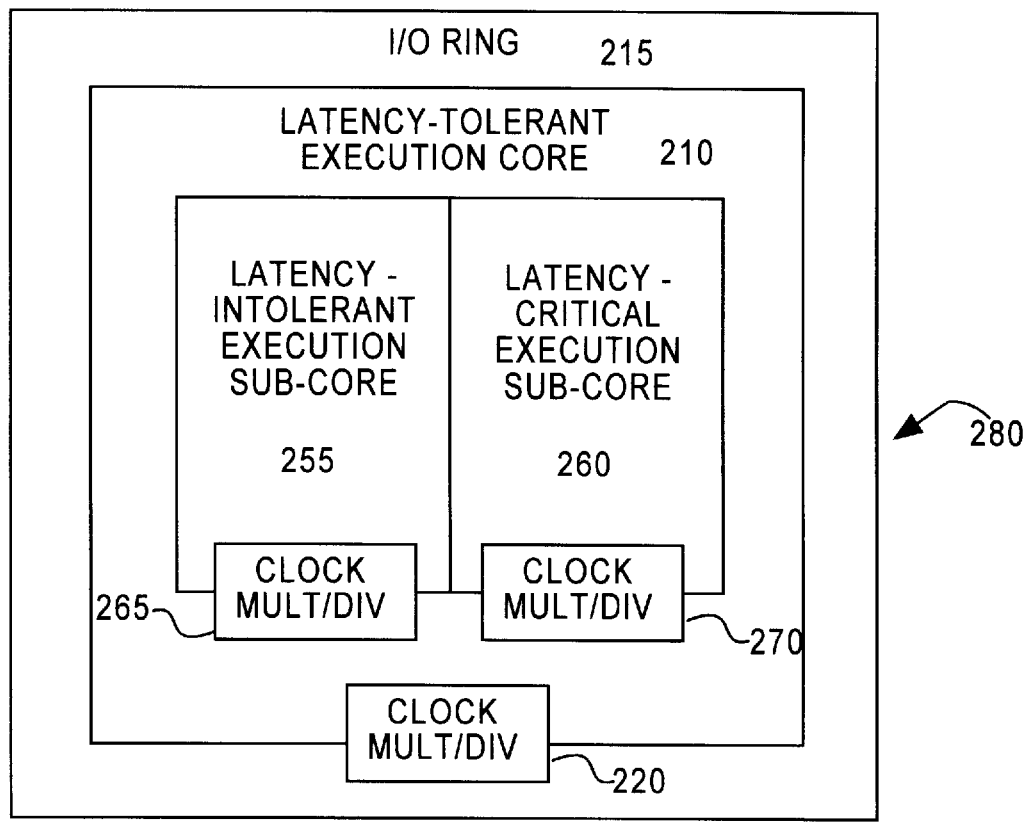
FIG. 5 is a block diagram illustrating a different mode in which the sub-core is not nested as shown in FIG. 4.

FIG. 5 shows an embodiment which is slightly different than that of FIG. 4. The processor 280 includes the I/O ring 215, the execution cores 210, 255, 260, and the clock mult/div units 220, 265, 270. However, in this embodiment the latency-critical execution sub-core 260 is not nested within the latency-intolerant execution core 255. In this mode, the clock mult/div units 265 and 270 perform different ratios of multiplication to enable their respective cores to run at different speeds.

In another slightly different mode (not shown), either of these cores might be clock-interfaced directly to the I/O ring or to the external world. In such a mode, clock mult/div units may not be required, if separate clock signals are provided from outside the processor.

It should be noted that the different speeds at which the various layers of sub-core operate may be in-use, operational speeds. It is known, for example in the Pentium processor, that certain units may be powered down when not in use, by reducing or halting their clock; in this case, the processor may have the bulk of its core running at 66 MHz while a sub-core such as the FPU is at substantially 0 MHZ. While the present invention may be used in combination with such power-down or clock throttling techniques, it is not limited to such cases.

Those skilled in the art will appreciate that non-integer ratios may be applied at any of the boundaries, and that the combinations of clock ratios between the various rings is almost limitless, and that different baseline frequencies could be used at the I/O ring. It is also possible that the clock multiplication factors might not remain constant over time. For example, in some modes, the clock multiplication applied to the innermost sub-core could be adjusted up and down, for example between 3X and 1X or between 2X and 0X or the like, when the higher frequency (and therefore higher power consumption and heat generation) are not needed. Also, the processor may be subjected to clock throttling or clock stop, in whole or in part. Or, the I/O clock might not be a constant frequency, in which case the other clocks may either scale accordingly, or they may implement some form of adaptive P/Q clocking scheme to maintain their desired performance level.

Figure 6:
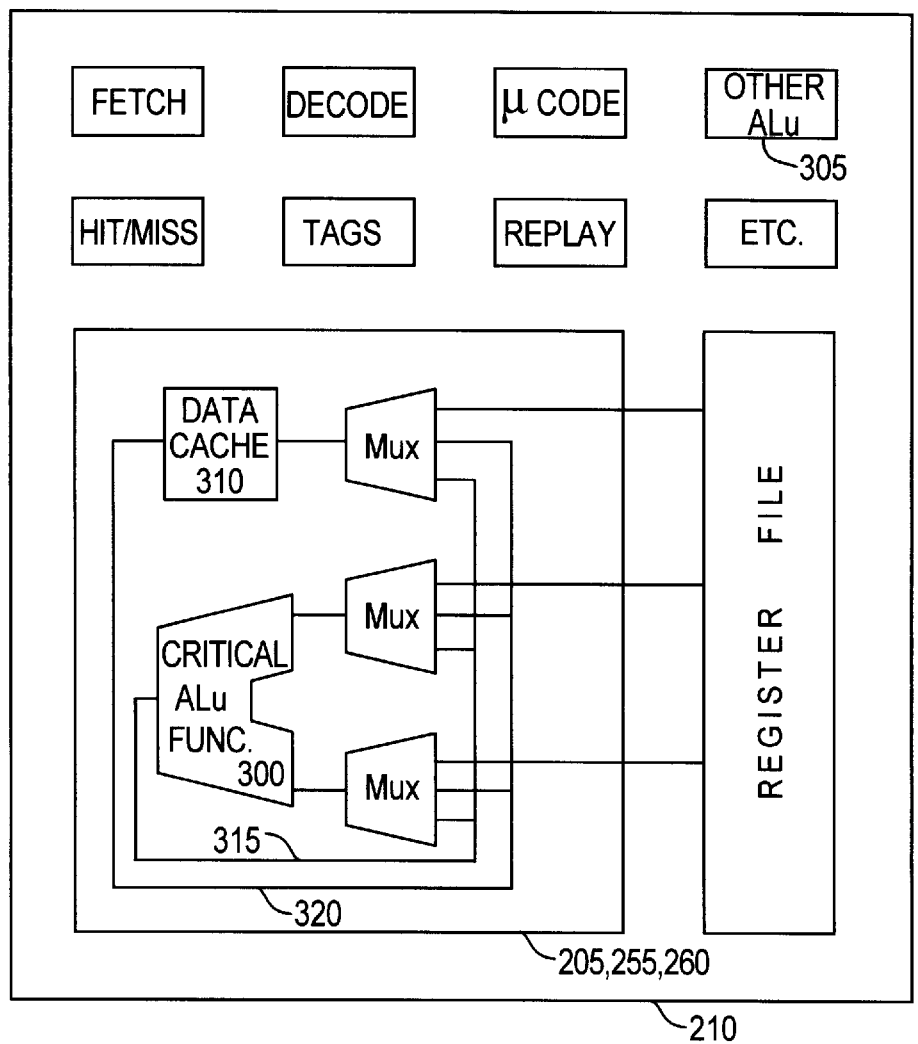
FIG. 6 is a block diagram illustrating a partitioning of the execution core.

FIG. 6 illustrates somewhat more detail about one embodiment of the contents of the latency-critical execution sub-core 260 of FIG. 4. (It may also be understood to illustrate the contents of the sub-core 205 of FIG. 3 or the sub-core 255 of FIG. 4.) The latency-tolerant execution core 210 includes components which are not latency-sensitive, but which are dependent only upon some level of throughput. In this sense, the latency-tolerant components may be thought of as the "plumbing" whose job is simply to provide a particular "gallons per minute" throughput, in which a "big pipe" is as good as a "fast flow".

For example, in some architectures the fetch and decode units may not be terribly demanding on execution latency, and may thus be put in the latency-tolerant core 210 rather than the latency-intolerant sub-core 205, 255, 260. Likewise, the microcode and register file may not need to be in the sub-core. In some architectures (or microarchitectures), the most latency-sensitive pieces are the arithmetic/logic functions and the cache. In the mode shown in FIG. 6, only a subset of the arithmetic/logic functions are deemed to be sufficiently latency-sensitive that it is warranted to put them into the sub-core, as illustrated by critical ALU 300.

In some embodiments, the critical ALU functions include adders, subtractors, and logic units for performing AND, OR, and the like. In some embodiments which use index register addressing, such as the Intel Architecture, the critical ALU functions may also include a small, special-purpose shifter for doing address generation by scaling the index register. In some embodiments, the register file may reside in the latency-critical execution core, for design convenience; the faster the core section the register file is in, the fewer ports the register file needs.

The functions which are generally more latency-sensitive than the plumbing are those portions which are of a recursive nature, or those which include a dependency chain. Execution is a prime example of this concept; execution tends to be recursive or looping, and includes both false and true data dependencies both between and within iterations and loops.

Current art in high performance computer design (e.g. the Pentium Pro processor) already exploits most of the readily exploitable parallelism in a large class of important low P programs. It becomes extraordinarily difficult or even practically impossible to greatly increase P for these programs. In this case there is no alternative to reducing the average latency if it is desired to build a processor to run these programs faster.

On the other hand, there are certain other functions such as for example, instruction decode, or register renaming. While it is essential that these functions are performed, current art has it arranged that the lapsed time for performing these functions may have an effect on performance only when a branch has been miss predicted. A branch is miss predicted typically once in fifty instructions on average. Hence one nanosecond longer to do decoding or register renaming provides the equivalent of 1/50 nanoseconds increase in average instruction execution latency while one nanosecond increase in the time to execute an instruction increases the average instruction latency by one nanosecond. We may conclude that the time it takes to decode instructions or rename registers, for example, is significantly less critical than the time it takes to execute instructions.

There are still other functions that must be performed in a processor. Many of these functions are even more highly leveraged than decoding and register renaming. For these functions 1 nsec increase in the time to perform them may add even less than 1/50 nanoseconds to the average execution latency. We may conclude that the time it takes to do these functions is even less critical.

As shown, the other ALU functions 305 can be relegated to the less speedy core 210. Further, in the mode shown in FIG. 6, only a subset of the cache needs to be inside the sub-core. As illustrated, only the data storage portion 310 of the cache is inside the sub-core, while the hit/miss logic and tags are in the slower core 210. This is in contrast to the conventional wisdom, which is that the hit/miss signal is needed at the same time as the data. A recent paper implied that the hit/miss signal is the limiting factor on cache speed (Austin, Todd M, "Streamlining Data Cache Access with Fast Address Calculation", Dionisios N. Pneumatikatos, Giandinar S. Sohi, Proceedings of the 22nd Annual International Symposium on Computer Architecture, Jun. 18–24, 1995, Session 8, No. 1, page 5). Unfortunately, hit/miss determination is more difficult and more time-consuming than the simple matter of reading data contents from cache locations.

Further, the instruction cache (not shown) may be entirely in the core 210, such that the cache 310 stores only data. The instruction cache (Icache) is accessed speculatively. It is the business of branch prediction to predict where the flow of the program will go, and the Icache is accessed on the basis of that prediction. Branch prediction methods commonly used today can predict program flow without ever seeing the instructions in the Icache. If such a method is used, then the Icache is not latency-sensitive, and becomes more bandwidth-constrained than latency-constrained, and can be relegated to a lower clock frequency portion of the execution core.

The branch prediction itself could be latency-sensitive, so it would be a good candidate for a fast cycle time in one of the inner sub-core sections.

Figure 1:
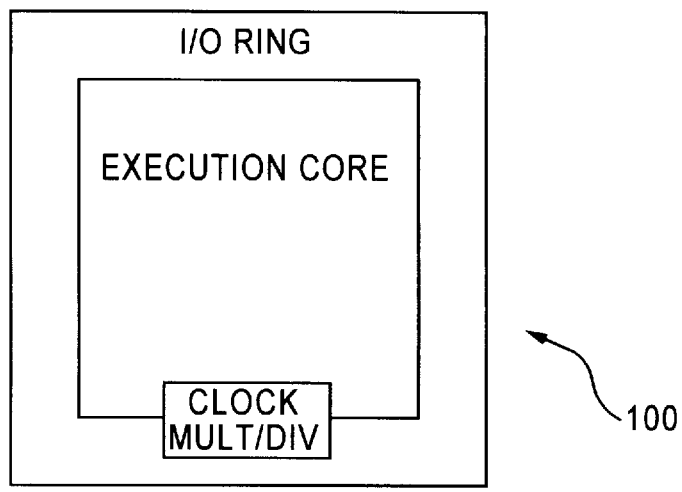
FIG. 1 is a block diagram illustrating a prior art processor having an I/O ring and an execution core operating at different clock speeds.
Figure 2:
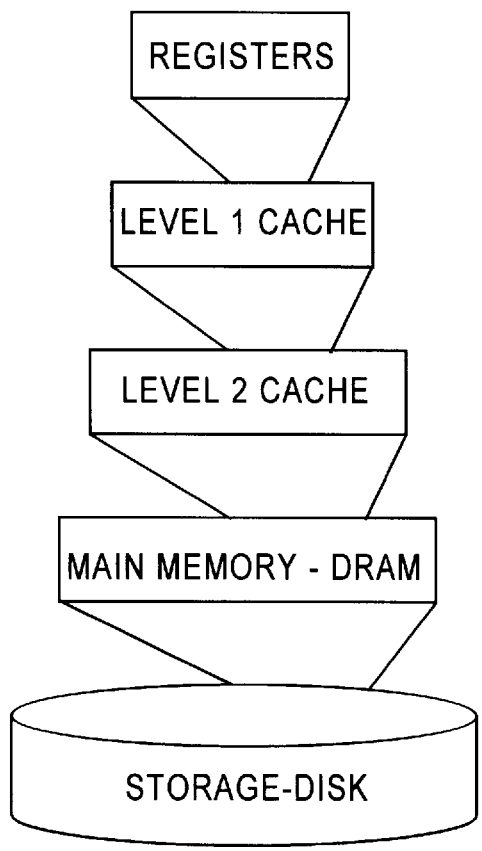
FIG. 2 demonstrates a hierarchical memory structure such as is well known in the art.

At first glance, one might think that the innermost sub-core 205, 255, or 260 of FIG. 6 would therefore hold the data which is stored at the top of the memory hierarchy of FIG. 2, that is, the data which is stored in the registers. However, as is illustrated in FIG. 6, the register file need not be contained within the sub-core, but may, instead, be held in the less speedy portion of the core 210. In the mode of FIGS. 3 or 4, the register file may be stored in any of the core sections 205, 210, 255, 260, as suits the particular embodiment chosen. As shown in FIG. 6, the reason that the register file is not required to be within the innermost core is that the data which result from operations performed in the critical ALU 300 are available on a bypass bus 315 as soon as they are calculated. By appropriate operation of multiplexors (in any conventional manner), these data can be made available to the critical ALU 300 in the next clock cycle of the sub-core, far sooner than they could be written to and then read from the register file.

Similarly, if data speculation is permitted, that is, if the critical ALU is allowed to perform calculations upon operands which are not yet known to be valid, portions of the data cache need not reside within the innermost sub-core. In this mode, the data cache 310 holds only the actual data, while the hit/miss logic and cache tags reside in a slower portion 210 of the core. In this mode, data from the data cache 310 are provided over an inner bus 320 and muxed into the critical ALU, and the critical ALU performs operations assuming those data to be valid.

Some number of clock cycles later, the hit/miss logic or the tag logic in the outer core may signal that the speculated data is, in fact, invalid. In this case, there must be a means provided to recover from the speculative operations which have been performed. This includes not only the specific operations which used the incorrect, speculated data as input operands, but also any subsequent operations which used the outputs of those specific operations as inputs. Also, the erroneously generated outputs may have subsequently been used to determine branching operations, such as if the erroneously generated output is used as a branch address or as a branch condition. If the processor performs control speculation, there may have also been errors in that operation as well.

The present invention provides a replay mechanism for recovering from data speculation upon data which ultimately prove to have been incorrect. In one mode, the replay mechanism may reside outside the innermost core, because it is not terribly latency-critical. While the replay architecture is described in conjunction with a multiple-clock-speed execution engine which performs data speculation, it will be appreciated that the replay architecture may be used with a wide variety of architectures and micro-architectures, including those which perform data speculation and those which do not, those which perform control speculation and those which do not, those which perform in-order execution and those which perform out-of-order execution, and so forth.

Figure 7:
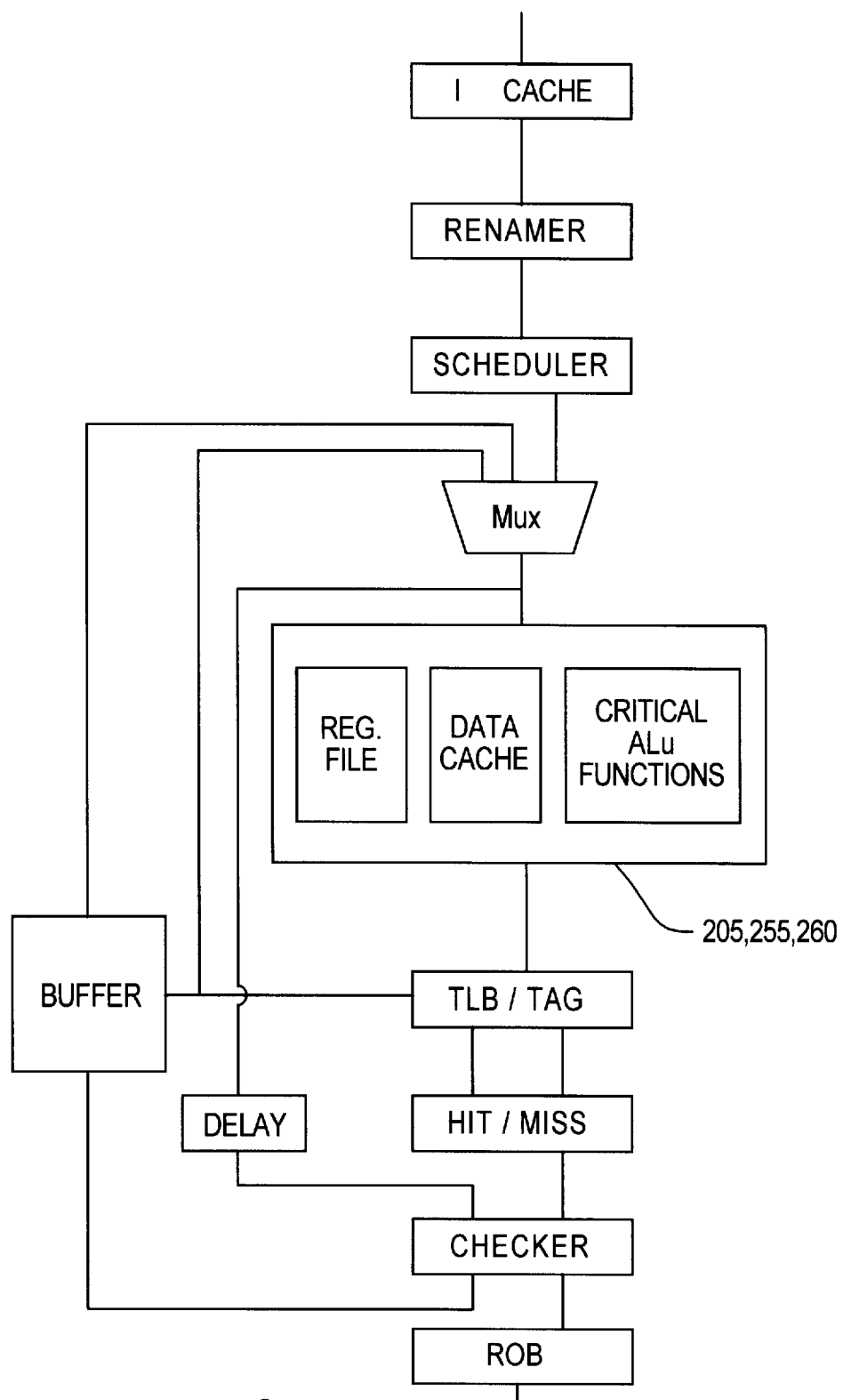
FIG. 7 is a block diagram illustrating one embodiment of the replay architecture of the present invention, which permits data speculation.

FIG. 7 illustrates one implementation of such a replay architecture, generally showing the data flow of the architecture. First, an instruction is fetched into the instruction cache.

From the instruction cache, the instruction proceeds to a renamer such as a register alias table. In sophisticated microarchitectures which permit data speculation and/or control speculation, it is highly desirable to decouple the actual machine from the specific registers indicated by the instruction. This is especially true in an architecture which is register-poor, such as the Intel Architecture. Renamers are well known, and the details of the renamer are not particularly germane to an understanding of the present invention. Any conventional renamer will suffice. It is desirable that it be a single-valued and single-assignment renamer, such that each instance of a given instruction will write to a different register, although the instruction specifies the same register. The renamer provides a separate storage location for each different value that each logical register assumes, so that no such value of any logical register is prematurely lost (i.e. before the program is through with that value), over a well-defined period of time.

From the renamer, the instruction proceeds to an optional scheduler such as a reservation station, where instructions are reordered to improve execution efficiency. The scheduler is able to detect when it is not allowed to issue further instructions. For example, there may not be any available execution slots into which a next instruction could be issued. Or, another unit may for some reason temporarily disable the scheduler. In some embodiments, the scheduler may reside in the latency-critical execution core, if the particular scheduling algorithm can schedule only single latency generation per cycle, and is therefore tied to the latency of the critical ALU functions.

From the renamer or the optional scheduler, the instruction proceeds to the execution core 205, 210, 255, 260 (indirectly through a multiplexor to be described below), where it is executed. After or simultaneous with its execution, an address associated with the instruction is sent to the translation lookaside buffer (TLB) and cache tag lookup logic (TAG). This address may be, for example, the address (physical or logical) of a data operand which the instruction requires. From the TLB and TAG logic, the physical address referenced and the physical address represented in the cache location accessed are passed to the hit/miss logic, which determines whether the cache location accessed in fact contained the desired data.

In one mode, if the instruction being executed reads memory, the execution logic gives the highest priority to generating perhaps only a portion of the address, but enough that data may be looked up in the high speed data cache. In this mode, this partial address is used with the highest priority to retrieve data from the data cache, and only as a secondary priority is a complete virtual address, or in the case of the Intel Architecture, a complete linear address, generated and sent to the TLB and cache TAG lookup logic.

Because the critical ALU functions and the data cache are in the innermost sub-core—or are at least in a portion of the processor which runs at a higher clock rate than the TLB and TAG logic and the hit/miss logic—some data will have already been obtained from the data cache and the processor will have already speculatively executed the instruction which needed that data, the processor having assumed the data that was obtained to have been correct, and the processor likely having also executed additional instructions using that data or the results of the first speculatively executed instruction.

Therefore, the replay architecture includes a checker unit which receives the output of the hit/miss logic. If a miss is indicated, the checker causes a "replay" of the offending instruction and any which depended on it or which were otherwise incorrect as a result of the erroneous data speculation. When the instruction was handed from the reservation station to the execution core, a copy of it was forwarded to a delay unit which provides a delay latency which matches the time the instruction will take to get through the execution core, TLB/TAG, and hit/miss units, so that the copy arrives at the checker at about the same time that the hit/miss logic tells the checker that the data speculation was incorrect. In one mode, this is roughly 10–12 clocks of the inner core. In FIG. 7, the delay unit is shown as being outside the checker. In other embodiments, the delay unit may be incorporated as a part of the checker. In some embodiments, the checker may reside within the latency-critical execution core, if the checking algorithm is tied to the critical ALU speed.

When the checker determines that data speculation was incorrect, the checker sends the copy of the instruction back around for a "replay". The checker forwards the copy of the instruction to a buffer unit. It may happen as an unrelated event that the TLB/TAG unit informs the buffer that the TLB/TAG is inserting a manufactured instruction in the current cycle. This information is needed by the buffer so the buffer knows not to reinsert another instruction in the same cycle. Both the TLB/TAG and the buffer also inform the scheduler when they are inserting instructions, so the scheduler knows not to dispatch an instruction in that same cycle. These control signals are not shown but will be understood by those skilled in the art.

The buffer unit provides latching of the copied instruction, to prevent it from getting lost if it cannot immediately be handled. In some embodiments, there may be conditions under which it may not be possible to reinsert replayed instructions immediately. In these conditions, the buffer holds them—perhaps a large number of them— until they can be reinserted. One such condition may be that there may be some higher priority function that could claim execution, such as when the TLB/TAG unit needs to insert a manufactured instruction, as mentioned above. In some other embodiments, the buffer may not be necessary.

Earlier, it was mentioned that the scheduler's output was provided to the execution core indirectly, through a multiplexor. The function of this multiplexor is to select among several possible sources of instructions being sent for execution. The first source is, of course, the scheduler, in the case when it is an original instruction which is being sent for execution. The second source is the buffer unit, in the case when it is a copy of an instruction which is being sent for replay execution. A third source is illustrated as being from the TLB/TAG unit; this permits the architecture to manufacture "fake instructions" and inject them into the instruction stream. For example, the TLB logic or TAG logic many need to get another unit to do some work for them, such as to read some data from the data cache as might be needed to evict that data, or for refilling the TLB, or other purposes, and they can do this by generating instructions which did not come from the real instruction stream, and then inserting those instructions back at the multiplexor input to the execution core.

The mux control scheme may, in one mode, include a priority scheme wherein a replay instruction has higher priority than an original instruction. This is advantageous because a replay instruction is probably older than the original instruction in the original macroinstruction flow, and may be a "blocking" instruction such as if there is a true data dependency.

It is desirable to get replayed instructions finished as quickly as possible. As long as there are unresolved instructions sent to replay, new instructions that are dispatched have a fairly high probability of being dependent on something unresolved and therefore of just getting added to the list of instructions that need to be replayed. As soon as it is necessary to replay one instruction, that one instruction tends to grow a long train of instructions behind it that follows it around. The processor can quickly get in a mode where most instructions are getting executed two or three times, and such a mode may persist for quite a while. Therefore, resolving replayed instructions is very much preferable to introducing new instructions.

Each new instruction introduced while there are things to replay is a gamble. There is a certain probability the new instruction will be independent and some work will get done. On the other hand, there is a certain probability that the new instruction will be dependent and will also need to be replayed. Worse, there may be a number of instructions to follow that will be dependent on the new instruction, and all of those will have to be replayed, too, whereas if the machine had waited until the replays were resolved, then all of these instructions would not have to execute twice.

In one mode, a manufactured instruction may have higher priority than a replay instruction. This is advantageous because these manufactured instructions may be used for critically important and time-sensitive operations. One such sensitive operation is an eviction. After a cache miss, new data will be coming from the L1 cache. When that data arrives, it must be put in the data cache (L0) as quickly as possible. If that is done, the replayed load will just meet the new data and will now be successful. If the data is even one cycle late getting the data there, the replayed load will pass again too soon and must again be replayed. Unfortunately, the data cache location where the processor is going to put the data is now holding the one and only copy of some data that was written some time ago. In other words, the location is "dirty". It is necessary to read the dirty data out, to save it before the new data arrives and is written in its place. This reading of the old data is called "evicting" the data. In some embodiments, there is just exactly enough time to complete the eviction before starting to write the new data in its place. The eviction is done with one or more manufactured instructions. If they are held up for even one cycle, the eviction does not occur in time to avoid the problem described above, and therefore they must be given the highest priority.

The replay architecture may also be used to enable the processor to in effect "stall" without actually slowing down the execution core or performing clock throttling or the like. There are some circumstances where it would be necessary to stall the frontend and/or execution core, to avoid losing the results of instructions or to avoid other such problems. One example is where the processor's backend temporarily runs out of resources such as available registers into which to write execution results. Other examples include where the external bus is blocked, an upper level of cache is busy being snooped by another processor, a load or store crosses page boundary, an exception occurs, or the like.

In such circumstances, rather than halt the frontend or throttle the execution core, the replay architecture may very simply be used to send back around for replay all instructions whose results would be otherwise lost. The execution core remains functioning at full speed, and there are no additional signal paths required for stalling the frontend, beyond those otherwise existing to permit the multiplexor to give priority to replay instructions over original instructions.

Other stall-like uses can be made of the replay architecture. For example, assume that a store address instruction misses in the TLB. Rather than saving the linear address to process after getting the proper entry in the TLB, the processor can just drop it on the floor and request the store address instruction to be replayed. As another example, the Page Miss Handler (not shown) may be busy. In this case the processor does not even remember that it needs to do a page walk, but finds that out over again when the store address comes back.

Most cases of running out of resources occur when there is a cache miss. There could well be no fill buffer left, so the machine can't even request an L1 lookup. Or, the L1 may be busy. When a cache miss happens, the machine MAY ask for the data from a higher level cache and MAY just forget the whole thing and not do anything at all to help the situation. In either case, the load (or store address) instruction is replayed. Unlike a more conventional architecture, the present invention does not NEED to remember this instruction in the memory subsystem and take care of it. The processor will do something to help it if it has the resources to do something. If not, it may do nothing at all, not even remember that such a instruction was seen by the memory subsystem. The memory subsystem, by itself, will never do anything for this instance of the instruction. When the instruction executes again, then it is considered all over again. In the case of a store address instruction, the instruction has delivered its linear address to the memory subsystem and it doesn't want anything back. A more conventional approach might be to say that this instruction is done, and any problems from here on out are memory subsystem problems, in which case the memory subsystem must then store information about this store address until it can get resources to take care of it. The present approach is that the store address replays, and the memory subsystem does not have to remember it at all. Here it is a little more clear that the processor is replaying the store address specifically because of inability to handle it in the memory subsystem.

In one mode, when an instruction gets replayed, all dependent instructions also get replayed. This may include all those which used the replayed instruction's output as input, all those which are down control flow branches picked according to the replayed instruction, and so forth.

The processor does not replay instructions merely because they are control flow dependent on an instruction that replayed. The thread of control was predicted. The processor is always following a predicted thread of control and never necessarily knows during execution if it is going the right way or not. If a branch gets bad input, the branch instruction itself is replayed. This is because the processor cannot reliably determine from the branch if the predicted thread of control is right or not, since the input data to the branch was not valid. No other instructions get replayed merely because the branch got bad data. Eventually—possibly after many replays—the branch will be correctly executed. At this time, it does what all branches do—it reports if the predicted direction taken for this branch was correct or not. If it was correctly predicted, everything goes on about its business. If it was not correctly predicted, then there is simply a branch misprediction; the fact that this branch was replayed any number of times makes no difference. A mispredicted branch cannot readily be repaired with a replay. A replay can only execute exactly the same instructions over again. If a branch was mispredicted, the processor has likely done many wrong instructions and needs to actually execute some completely different instructions.

To summarize: A instruction is replayed either: 1) because the instruction itself was not correctly processed for any reason, or 2) if the input data that this instruction uses is not known to be correct. Data is known to be correct if it is produced by a instruction that is itself correctly processed and all of its input data is known to be correct. In this definition, branches are viewed not as having anything to do with the control flow but as data handling instructions which simply report interesting things to the front end of the machine but do not produce any output data that can be used by any other instruction. Hence, the correctness of any other instruction cannot have anything to do with them. The correctness of the control flow is handled by a higher authority and is not in the purview of mere execution and replay.

Figure 8:
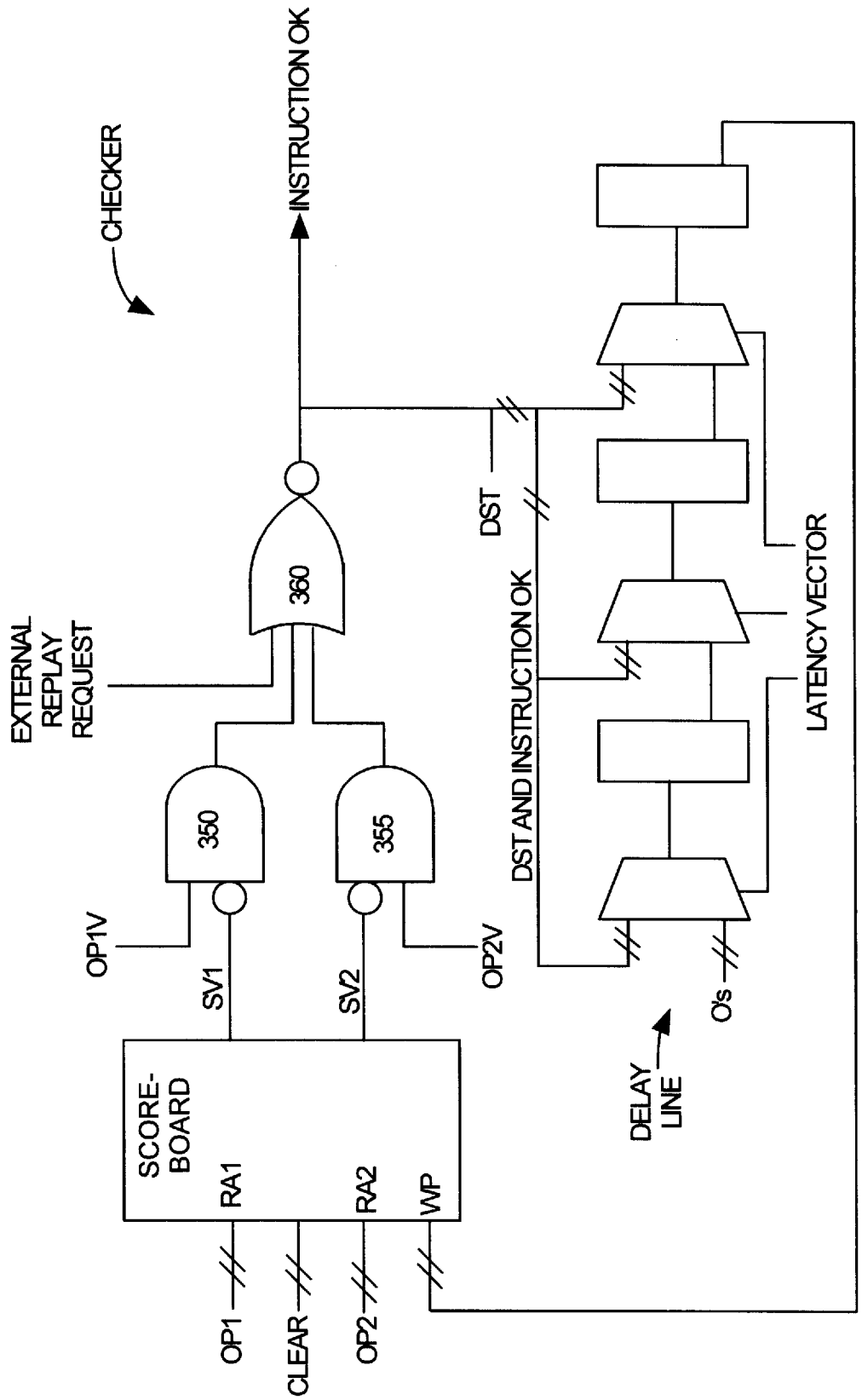
FIG. 8 illustrates one embodiment of the checker unit of the replay architecture.

FIG. 8 illustrates more about the checker unit. Again, a instruction is replayed if: 1) it was not processed correctly, or 2) if it used input data that is not known to be correct. These two conditions give a good division for discussing the operation of the checker unit. The first condition depends on everything that needs to be done for the instruction. Anything in the machine that needs to do something to correctly execute the instruction is allowed to goof and to signal to the checker that it goofed. The first condition is therefore talking about signals that come into the checker, potentially from many places, that say, "I goofed on this instruction."

In some embodiments, the most common goof is the failure of the data cache to supply the correct result for a load. This is signaled by the hit/miss logic. Another common goof is failure to correctly process a store address; this would typically result from a TLB miss on a store address, but there can be other causes, too. In some embodiments, the L1 cache may deliver data (which may go into the L0 cache and be used by instructions) that contains an ECC error. This would be signaled quickly, and then corrected as time permits.

In some fairly rare cases, the adder cannot correctly add two numbers. This is signaled by the flag logic which keeps tabs on the adders. In some other rare cases, the logic unit fails to get the correct answer when doing an AND, XOR, or other simple logic operation. These, too, are signaled by the flag logic. In some embodiments, the floating point unit may not get the correct answer all of the time, in which case it will signal when it goofs a floating point operation. In principle, you could use this mechanism for many types of goofs. It could be used for algorithmic goofs and it could even be used for hardware errors (circuit goofs). Regardless the cause, whenever the processor doesn't do exactly what it is supposed to do, and the goof is detected, the processor's various units can request a replay by signaling to the checker.

The second condition which causes replays—whether data is known to be correct—is entirely the responsibility of the checker itself. The checker contains the official list of what data is known to be correct. It is what is sometimes called the "scoreboard". It is the checker's responsibility to look at all of the input data for each instruction execution instance and to determine if all such input data is known to be correct or not. It is also the checker's responsibility to add it all up for each instruction execution instance, to determine if the result produced by that instruction execution instance can therefore be deemed to be "known to be correct". If the result of a instruction is deemed "known to be correct", this is noted on the scoreboard so the processor now has new, known-correct data that can be the input for other instructions.

FIG. 8 illustrates one exemplary checker which may be employed in practicing the architecture of the present invention. Because the details of the checker are not necessary in order to understand the invention, a simplified checker is illustrated to show the requirements for a checker sufficient to make the replay system work correctly.

In this embodiment, one instruction is processed per cycle. After an instruction has been executed, it is represented to the checker by signals OP1, OP1V, OP2, OPV2, DST, and a latency vector which was assigned to the uop by the decoder on the basis of the opcode. The signals OPLV and OP2V indicate whether the instruction includes a first operand and a second operand, respectively. The signals OP1 and OP2 identify the physical source registers of the first and second operands, respectively, and are received at read address ports RA1 and RA2 of the scoreboard. The signal DST identifies the physical destination register where the result of the instruction was written.

The latency vector has all 0's except a 1 in one position. The position of the 1 denotes the latency of this instruction. An instruction's latency is how many cycles there are after the instruction begins execution before another instruction can use its result. The scoreboard has one bit of storage for each physical register in the machine. The bit is 0 if that register is not known to contain correct data and it is 1 if that register is known to contain correct data.

The register renamer, described above, allocates these registers. At the time a physical register is allocated to hold the result of some instruction, the renamer sends the register number to the checker as multiple-bit signal CLEAR. The scoreboard sets to 0 the scoreboard bit which is addressed by CLEAR.

The one or two register operands for the instruction currently being checked (as indicated by OP1 and OP2) are looked up in the scoreboard to see if they are known to be correct, and the results are output as scoreboard values SV1 and SV2, respectively. An AND gate 350 receives the first scoreboard value SV1 and the first operand valid signal OP1V. Another AND gate 355 similarly receives signals SV2 and OP2V for the second operand. The operand valid signals OP1V and OP2V cause the scoreboard values SV1 and SV2 to be ignored if the instruction does not actually require those respective operands.

The outputs of the AND gates are provided to NOR gate 360, along with an external replay request signal. The output of the NOR gate will be false if either operand is required by the instruction and is not known to be correct, or if the external replay request signal is asserted. Otherwise the output will be true. The output of the NOR gate 360 is the checker output INSTRUCTION OK. If it is true, the instruction was completed correctly and is ready to be considered for retirement. If it is false, the instruction must be replayed.

A delay line receives the destination register identifier DST and the checker output INSTRUCTION OK information for the instruction currently being checked. The simple delay line shown is constructed of registers (single cycle delays) and muxes. It will be understood that each register and mux is a multiple-bit device, or represents multiple single-bit devices. Those skilled in the art will understand that various other types of delay lines, and therefore different formats of latency vectors, could be used.

The DST and INSTRUCTION OK information is inserted in one location of the delay line, as determined by the value of the latency vector. This information is delayed for the required number of cycles according to the latency vector, and then it is applied to the write port WP of the scoreboard. The scoreboard bit corresponding to the destination register DST for the instruction is then written according to the value of INSTRUCTION OK. A value of 1 indicates that the instruction did not have to be replayed, and a value of 0 indicates that the instruction did have to be replayed, meaning that its result data is not known to be correct.

In this design, it is assumed that no instruction has physical register zero as a real destination or as a real source. If there is no valid instruction in some cycle, the latency vector for that cycle will be all zeros. This will effectively enter physical register zero with the longest possible latency into the delay line, which is harmless. Similarly, an instruction that does not have a real destination register will specify a latency vector of all zeros. It is further assumed that at startup, this unit runs for several cycles with no valid instructions arriving, so as to fill the delay line with zeros before the first real instruction has been allocated a destination register, and hence before the corresponding bit in the scoreboard has been cleared. The scoreboard needs no additional initialization.

Potentially, this checker checks one instruction per cycle (but other embodiments are of course feasible). The cycle in which an instruction is checked is a fixed number of cycles after that instruction began execution and captured the data that it used for its operands. This number of cycles later is sufficient to allow the EXTERNAL REPLAY REQUEST signal for the instruction to arrive at the checker to be processed along with the other information about the instruction. The EXTERNAL REPLAY REQUEST signal is the OR of all signals from whatever parts of the machine may produce replay requests that indicate that the instruction was not processed correctly. For example it may indicate that data returned from the data cache may not have been correct, for any of many reasons, a good example being that there was a cache miss.

It should be appreciated by the skilled reader that the particular partitionings described above are illustrative only. For example, although it has been suggested that certain features may be relegated to the outermost core 210, it may be desirable that certain of these reside in a mid-level portion of the core, such as in the latency-intolerant core 255 of FIG. 4, between the outermost core 210 and the innermost core 260. It should also be appreciated that although the invention has been described with reference to the Intel Architecture processors, it is useful in any number of alternative architectures, and with a wide variety of microarchitectures within each.

While the invention has been described with reference to specific modes and embodiments, for ease of explanation and understanding, those skilled in the art will appreciate that the invention is not necessarily limited to the particular features shown herein, and that the invention may be practiced in a variety of ways which fall under the scope and spirit of this disclosure. The invention is, therefore, to be afforded the fullest allowable scope of the claims which follow.

We claim:

1. A microprocessor comprising:
   a third execution sub-core that performs execution operations at a third clock frequency which is higher than a second clock frequency by at least a factor of 1.5, wherein the third execution sub-core comprises,
      an adder; and
      logic means that performs AND and OR operations;
   a second execution sub-core that performs execution operations at the second clock frequency wherein the second execution sub-core comprises,
      a multiplier; and
      a shifter; and
   a first execution sub-core that performs execution operations at a first clock frequency, wherein the first execution sub-core comprises,
      an instruction fetch unit; and
      an instruction decoder.

2. A microprocessor comprising:
   a third execution sub-core that performs execution operations at a third clock frequency which is higher than a second clock frequency by at least a factor of 1.5, wherein the third execution sub-core comprises,
      a data cachet;
      an adder; and
      logic means that performs AND and OR operations;
   a second execution sub-core that performs execution operations at the second clock frequency, wherein the second execution sub-core comprises,
      a multiplier; and
      a shifter; and
   a first execution sub-core that performs execution operations at a first clock frequency, wherein the first execution sub-core comprises,
      an instruction fetch unit; and
      an instruction decoder.

3. A microprocessor comprising:
   a third execution sub-core that performs execution operations at a third clock frequency which is higher than a second clock frequency by at least a factor of 1.5, wherein the third execution sub-core comprises,
      a register file;
      a data cache;
      an adder; and
      logic means that performs AND and OR operations;
   second execution sub-core that performs execution operations at the second clock frequency, wherein the second execution sub-core comprises,
      a multiplier; and
      a shifter; and
   a first execution sub-core that performs execution operations at a first clock frequency, wherein the first execution sub-core comprises,
      an instruction fetch unit; and
      an instruction decoder.

4. A microprocessor comprising:
   a third execution sub-core that performs execution operations at a third clock frequency which is higher than a second clock frequency by at least a factor of 1.5, wherein the third execution sub-core comprises,
      an adder; and
      logic means that performs AND and OR operations;
   a second execution sub-core that performs execution operations at the second clock frequency, wherein the second execution sub-core comprises,
      a register file;
      a multiplier; and
      a shifter; and
   a first execution sub-core that performs execution operations at a first clock frequency, wherein the first execution sub-core comprises,
      an instruction fetch unit; and
      an instruction decoder.

* * * * *

UNITED STATES PATENT AND TRADEMARK OFFICE
CERTIFICATE OF CORRECTION

PATENT NO.   : 5,828,868
DATED        : October 27, 1998
INVENTOR(S)  : Sager et al.

It is certified that error appears in the above-identified patent and that said Letters Patent is hereby corrected as shown below:

Column 13,
Line 56, delete "OPLV" and insert -- OP1V --.

Column 16,
Line 3, delete "cachet" and insert -- cache --.

Signed and Sealed this

Twenty-fourth Day of June, 2003

JAMES E. ROGAN
*Director of the United States Patent and Trademark Office*